United States Patent
Genga, Jr. et al.

(10) Patent No.: US 12,041,893 B1
(45) Date of Patent: *Jul. 23, 2024

(54) GROW LIGHT ASSEMBLY WITH INSPECTION MODE AND METHOD OF OPERATING THEREOF

(71) Applicant: Growgenics LLC, East Greenwich, RI (US)

(72) Inventors: Richard A. Genga, Jr., East Greenwich, RI (US); Hamid Pishdadian, Warwick, RI (US)

(73) Assignee: Growgenics LLC, East Greenwich, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,232

(22) Filed: Aug. 17, 2022

Related U.S. Application Data

(63) Continuation-in-part of application No. 17/062,650, filed on Oct. 5, 2020, now Pat. No. 11,452,264, which
(Continued)

(51) Int. Cl.
*A01G 7/04* (2006.01)
*F21V 21/15* (2006.01)
(Continued)

(52) U.S. Cl.
CPC .............. *A01G 7/045* (2013.01); *F21V 21/15* (2013.01); *F21V 23/003* (2013.01); *F21V 29/56* (2015.01);
(Continued)

(58) Field of Classification Search
CPC .. A01G 7/04; A01G 7/045; F21K 9/65; F21V 21/15; F21V 21/30; F21V 14/02; Y02P 60/149; Y10S 362/805
See application file for complete search history.

(56) References Cited

U.S. PATENT DOCUMENTS 3,882,306 A    5/1975    Armstrong
4,568,052 A    2/1986    Solomon et al.
(Continued)

FOREIGN PATENT DOCUMENTS

DE      102011015407 A1 * 10/2012              A01G 7/045

OTHER PUBLICATIONS

Machine translation of DE-102011015407-A1, retrieved from worldwide.espacenet.com on Sep. 5, 2023 (Year: 2023).*

*Primary Examiner* — Abdulmajeed Aziz
*Assistant Examiner* — Steven Y Horikoshi
(74) *Attorney, Agent, or Firm* — Hanrahan Law Firm, P.A.; Benjamin M. Hanrahan

(57) ABSTRACT

A grow light for stimulating plant growth is presented herein. The grow light includes a plurality of primary light modules with LEDs fixedly mounted to a support assembly and spaced a distance away from a plant canopy, and one or more secondary light modules movably or pivotally mounted to an end of one or more of the primary light modules. A positioning assembly is disposed interconnected light modules for manually or automatically movably disposing the secondary light modules into different angular positions relative to the plant. A height adjustment assembly is also include to movably position the light assembly, such as the plurality of primary light modules or the secondary light modules in a vertical direction. Additional features can be included, such as positioning sensors, environmental sensors, CO2 delivery systems, water cooling systems, ground wire interconnections, and light frequency control.

6 Claims, 15 Drawing Sheets

Related U.S. Application Data is a continuation of application No. 15/934,953, filed on Mar. 24, 2018, now Pat. No. 10,842,082.

(60) Provisional application No. 63/276,071, filed on Nov. 5, 2021.

(51) Int. Cl.
  *F21V 23/00*    (2015.01)
  *F21V 29/56*    (2015.01)
  *F21Y 103/10*   (2016.01)
  *F21Y 115/10*   (2016.01)

(52) U.S. Cl.
  CPC ....... *F21Y 2103/10* (2016.08); *F21Y 2115/10* (2016.08)

(56) References Cited

U.S. PATENT DOCUMENTS

| | | |
|---|---|---|
| 6,312,139 B1 | 11/2001 | Baker et al. |
| 6,393,927 B1 | 5/2002 | Biggs et al. |
| 6,416,207 B1 | 7/2002 | Chang |
| 6,488,387 B2 | 12/2002 | Wardenburg |
| 6,688,759 B1 | 2/2004 | Hadjimichael |
| 7,131,753 B1 | 11/2006 | Edwards, Jr. |
| 7,665,862 B2 | 2/2010 | Villard |
| 7,918,051 B2 | 4/2011 | Early |
| 8,057,060 B2 | 11/2011 | Fredricks |
| 8,358,097 B2 | 1/2013 | Cartwright |
| 8,408,739 B2 | 4/2013 | Villard et al. |
| 8,919,041 B2 | 12/2014 | Topping |
| 10,842,082 B1 | 11/2020 | Genga, Jr. et al. |
| 11,452,264 B1 | 9/2022 | Genga, Jr. et al. |
| 2005/0055779 A1 | 3/2005 | Damewood |
| 2008/0062689 A1 | 3/2008 | Villard |
| 2008/0062694 A1 | 3/2008 | Lai et al. |
| 2008/0253121 A1 | 10/2008 | Chien |
| 2011/0096454 A1 | 4/2011 | Corsi et al. |
| 2012/0075848 A1 | 3/2012 | Yamada et al. |
| 2012/0170264 A1 | 7/2012 | Mckenzie et al. |
| 2013/0258684 A1 | 10/2013 | Yang et al. |
| 2013/0263503 A1 | 10/2013 | Bostdorff |
| 2013/0283683 A1 | 10/2013 | Ringbom et al. |
| 2013/0301267 A1 | 11/2013 | Badley et al. |
| 2014/0003053 A1 | 1/2014 | Musser et al. |
| 2014/0049956 A1 | 2/2014 | Manahan et al. |
| 2016/0007424 A1 | 1/2016 | Maxik et al. |
| 2016/0064204 A1 | 3/2016 | Greenberg et al. |
| 2016/0088804 A1* | 3/2016 | Ooi ................. A01G 9/00 47/17 |
| 2016/0219794 A1 | 8/2016 | Greenberg et al. |
| 2017/0034895 A1* | 2/2017 | Vogel ................. A01G 7/045 |
| 2018/0035616 A1* | 2/2018 | Wagner ............... C03C 17/009 |

* cited by examiner

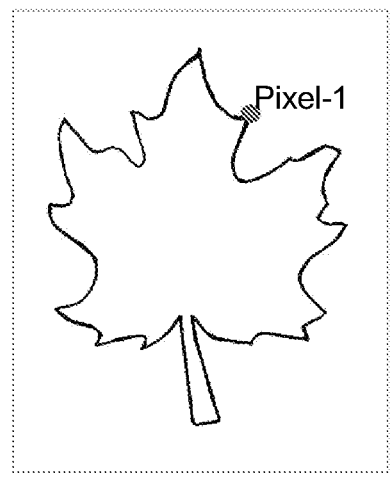 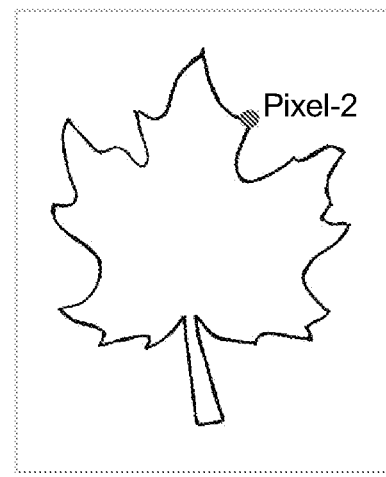
Camera-1 image      Camera-2 image
FIG. 16A      FIG. 16B

GROW LIGHT ASSEMBLY WITH INSPECTION MODE AND METHOD OF OPERATING THEREOF

CLAIM OF PRIORITY/CROSS-REFERENCE TO RELATED APPLICATION

The present application is based on and a claim of priority is made under 35 U.S.C. § 119(e) to U.S. Provisional Patent Application No. 63/276,071, filed on Nov. 5, 2021.

The present application is also a Continuation-In-Part (CIP) Patent Application of U.S. patent application Ser. No. 17/062,650 filed on Oct. 5, 2020, which is a Continuation Patent Application of U.S. patent application Ser. No. 15/934,953, filed on Mar. 24, 2018, issued as U.S. Pat. No. 10,842,082 on Nov. 24, 2020.

The contents of all of the above-referenced prior patent applications, namely U.S. Provisional Patent Application No. 63/276,071 filed on Nov. 5, 2021, U.S. patent application Ser. No. 17/062,650 filed on Oct. 5, 2020 and U.S. patent application Ser. No. 15/934,953 filed on Mar. 24, 2018, are incorporated herein in their entirety by reference.

FIELD OF THE INVENTION

The present invention is generally directed to a light assembly or grow light structured to facilitate or stimulate the growth of plants, for example, in the field of horticulture, indoor gardening, hydroponics, aquaponics, indoor vertical grow farms, etc. In certain embodiments, the grow light includes one or more light modules that can be moved or adjusted, e.g., in a vertical, angular or horizontal direction, either manually or automatically, in order to maximize the stimulation of plant growth.

Other embodiments of the present invention are generally directed to a horticultural light assembly or luminaire integrating at least two key components: 1) A luminaire or lighting assembly with automatic variable color LED frequency adjustment technology, i.e., UV, Blue, Red, Far Red, White, Green, etc., and 2) Integrated bi-focal camera technology to determine plant canopy height and growth. Utilizing dual digital camera technology and software, the system and method is able to track plant canopy growth as a function of time.

BACKGROUND OF THE INVENTION

Grow lights are often used to facilitate the growth of plants in many various indoor farm environments or indoor growing facilities. Conventionally, these grow lights incorporate or use fluorescent bulbs or high pressure sodium lamps (HPS) that are suspended or otherwise disposed directly above the plants in a straight downward facing direction. One problem with such a configuration is that light can only be projected from the top-down toward the plant. This limits the amount of light that is exposed to the lower portions of the plant such that most of the leaves below the top of the plant canopy are shaded and do not get the light need to stimulate effective growth. Consequently, mostly vertical growth is stimulated or promoted, and the plants often lack any horizontal growth often needed in some species or environments for an effective product.

In addition, the lights, bulbs or lamps often used, such as fluorescent or HPS bulbs, generate or produce extremely high or an excessive amount of heat. As such, the lights must always remain a large distance from the plant in order to avoid or potentially avoid exposing the plant to the heat and causing damage. In this manner, fluorescent and HPS lights must always remain a distance greater than or about 18 inches from the plant. By spacing the light from the plant such a great distance, the plant is not exposed to an efficient amount of photonic grow energy and will not produce or grow in the most efficient manner.

Other potential problems in the current industry of grow lights is the lack of consistency, the lack of ability to control the light output, as well as a lack of automation and repeatability.

Accordingly, there is a need in the art for a modular, customizable, and controllable light assembly that can project low heat, energy-efficient light to the plants from multiple angles. For example, the proposed light assembly can move, adjust or be positioned to emit light to the plant from the top as well as one or more sides in order ensure that the sides and lower portions of the plant, in addition to the top, are exposed to photonic grow energy from the lights. This promotes more efficient plant grown and produces better plants with more flower or output.

In addition, the proposed light assembly may use low heat light emitting diodes (LEDs) that allow the lights to be positioned within three to six inches of the plant or plant canopy. This delivers higher amount of photonic grow energy to the plant while utilizing approximately 50% less energy and 70-75% less heat. The LEDs can be controlled such that the light can be produced in specific key light frequencies among the light spectrum that is useful to plants, thereby further minimizing energy waste. For instance, plants use a photosynthetic active radiation (PAR) range of the light spectrum, which in terms of light frequency, is in the range of approximately 350 nanometers to approximately 750 nanometers. There are a number of different light frequencies (e.g., frequencies in the range of approximately 350 nm, 370 nm, 439 nm, 450 nm, 469 nm, 483 nm, 642 nm, 660 nm, 667 nm, and 740 nm) that can be used to drive key aspects of plant growth during the life of the plant. The proposed light assembly can be used to vary the light power, frequency, wavelength etc. of the LEDs throughout the life cycle of the plant, for example, based on specific algorithms, desires, data obtained, desired outcomes, plant species, etc. As an example, the light power can be varied from a low level at the beginning of a grow cycle to higher increased levels as the plant grows. This can be characterized as a power curve that grows with the plant. This feature results in significant electrical savings when compared to existing lighting technology, such as fluorescent, HPS, and HID lighting.

SUMMARY OF THE INVENTION

Accordingly, the present invention is directed to an innovative indoor growing system that provides low heat, low energy light modules, and in some embodiments, automated controls. As provided herein, the grow light assembly of the various embodiments is structured and configured to facilitate the growth of one or more plants by emitting light, e.g., by providing photosynthetic active radiation, upon the plant(s) from various angles or positions. The plants can include virtually any plant that can be grown indoors, including virtually any vegetable plant, flowering plant, fruiting plant, etc. including but certainly not limited to *cannabis* plants.

For instance, the light assembly of at least one embodiment may include a module, multi-component application with multiple light modules interconnected to one another, or otherwise interconnected to a support assembly. The light modules may be positioned or angled in various manners to substantially or fully surround a plant with the light or photosynthetic active radiation. Depending on the environment, desires, constraints, or plants grown, the light assembly can take on various configurations including a linear configuration or a partially or fully wrapped configuration, as examples.

In some embodiments, the angular orientation or vertical positioning of one or more of the light modules can be adjusted, either manually or automatically, for example, as the plant grows. In such a manner, the lights can move as the plant grows in order to continuously provide the maximum or optimum amount of light or PAR thereto. As described herein, the movement, positioning or adjustment may be manual in that a user can selectively move the light modules or light assembly when desired, for example, when he or she notices that the plant is growing. This can be done via manual adjustment knobs, pulleys, etc., for example, or via activating one or more motors or other like mechanical or electrical devices specifically configured to move the light modules. In other embodiments, the light modules can be automatically adjusted or positioned, such as, based upon data obtained or received by one or more sensors. In particular, positioning sensors, such as infrared transmitters/receivers, may be used to determine the position of the plant or plant canopy relative to the light modules. As the plant grows and gets closer to the light modules as detected by the sensor(s), various automated positioning assemblies and/or height adjustment assemblies may be automatically activated in order to move or adjust the light modules accordingly.

Other sensors may be included in some embodiments, such as environmental sensors that can detect and record data related to the ambient temperature in the room or environment, humidity, soil moisture, lighting, surface temperature of the plants, etc. This data, as well as the information obtained by the positioning sensors, and the varying light frequency, can be stored and analyzed to optimize the growth of plants. For instance, as provided herein, in some embodiments, the light frequency of the light modules or LEDs thereof can be controlled and varied during the different stages of plant growth. These frequencies can change the way in which the plant grows or reacts to the light and can have an effect on the overall health and product of the plant. The data associated with the varying light frequencies, environmental sensor data, and positioning data can be used to optimize or control the plant output, as desired, depending on the particular plant type or species and desired outcomes. The data can thus be used for repeating the same conditions, thereby providing a light assembly or system that can be useful for consistent and repeatable growing. The data or controls can also be sold to other growers who may also want to repeat or grow the same product.

Furthermore, at least one embodiment of the present invention may involve or otherwise include a system or method for automatically gathering plant canopy growth rates as a function of time via a 3D camera canopy measurement system, while also automatically varying key photosynthetic LED light color rations from the LED luminaires. In particular, utilizing software based artificial intelligence and machine learning methods, the brain or management system of the system/method of at least one embodiment is able to utilize custom developed methodologies such as genetic algorithms, fuzzy logic, etc., that would automatically vary light ratios while monitoring plant canopy growth. The system and/or method would then continually adjust light color ratios while measuring canopy growth with the sole purpose of converging on the best light color ratios to optimize the growth of a plant.

Furthermore, based upon measurements, algorithms, and perhaps pher information, the system and/or method of at least one embodiment may also automatically generate optimized LED color light ratios (Light Recipes) for any plant species, i.e., kale, micro-greens, lettuce, tomatoes, basil, etc. and to grow the plant to a healthy harvesting point in the shortest amount of time with the best visual appearance and potentially highest nutrient content.

These and other objects, features and advantages of the present invention will become more apparent when the drawings as well as the detailed description are taken into consideration.

BRIEF DESCRIPTION OF THE DRAWINGS

FIG. 16A is an exemplary view of camera-1 of at least one embodiment of the present invention.

FIG. 16B is an exemplary view of camera-2 of at least one embodiment of the present invention.

Like reference numerals refer to like parts throughout the several views of the drawings provided herein.

DETAILED DESCRIPTION OF THE INVENTION

Figure 1:
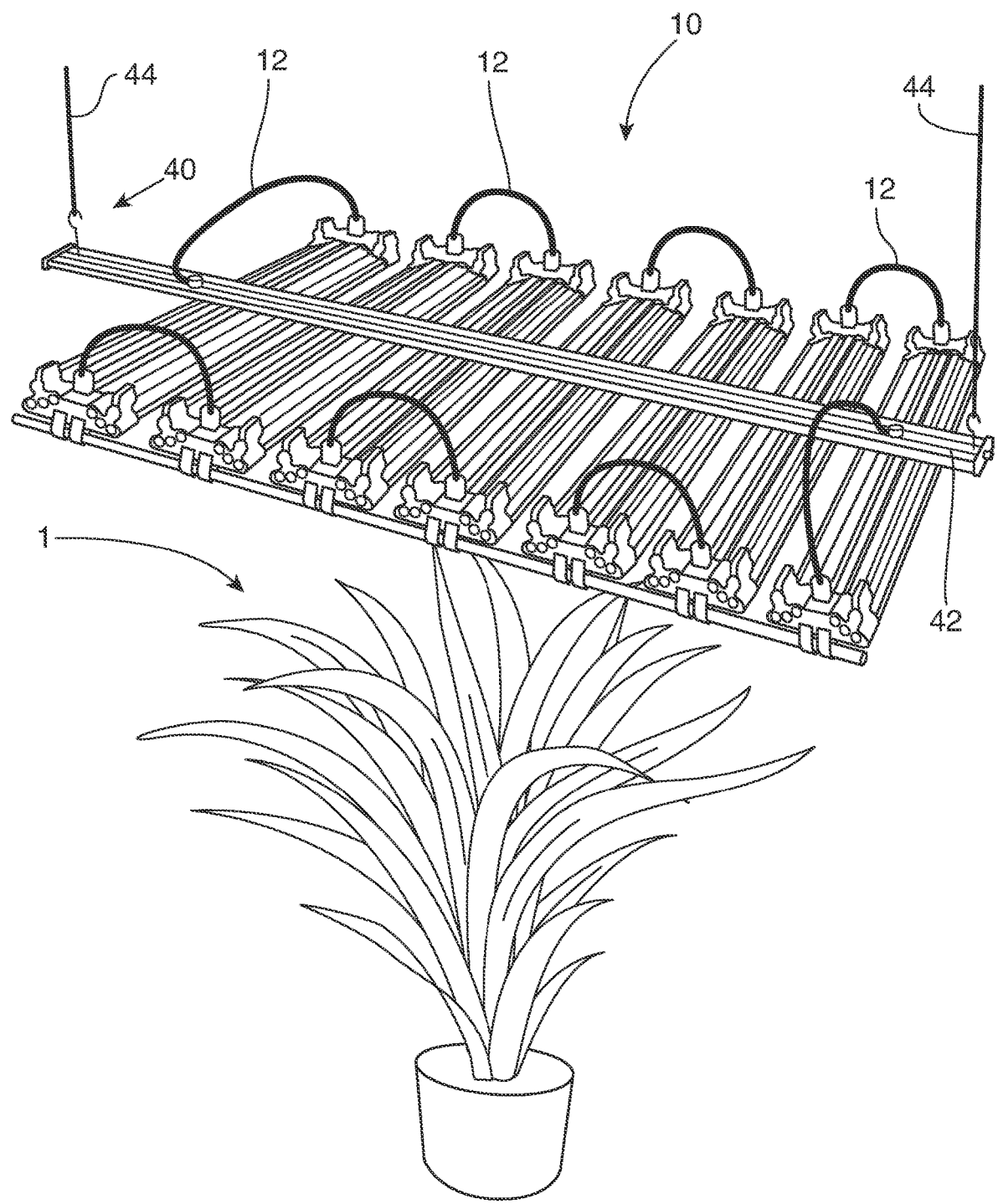
FIG. 1 is a partial top perspective view of the grow light assembly configured in a linear form and disposed in a spaced relation with a plant, as disclosed in accordance with at least one embodiment of the present invention.
Figure 2:
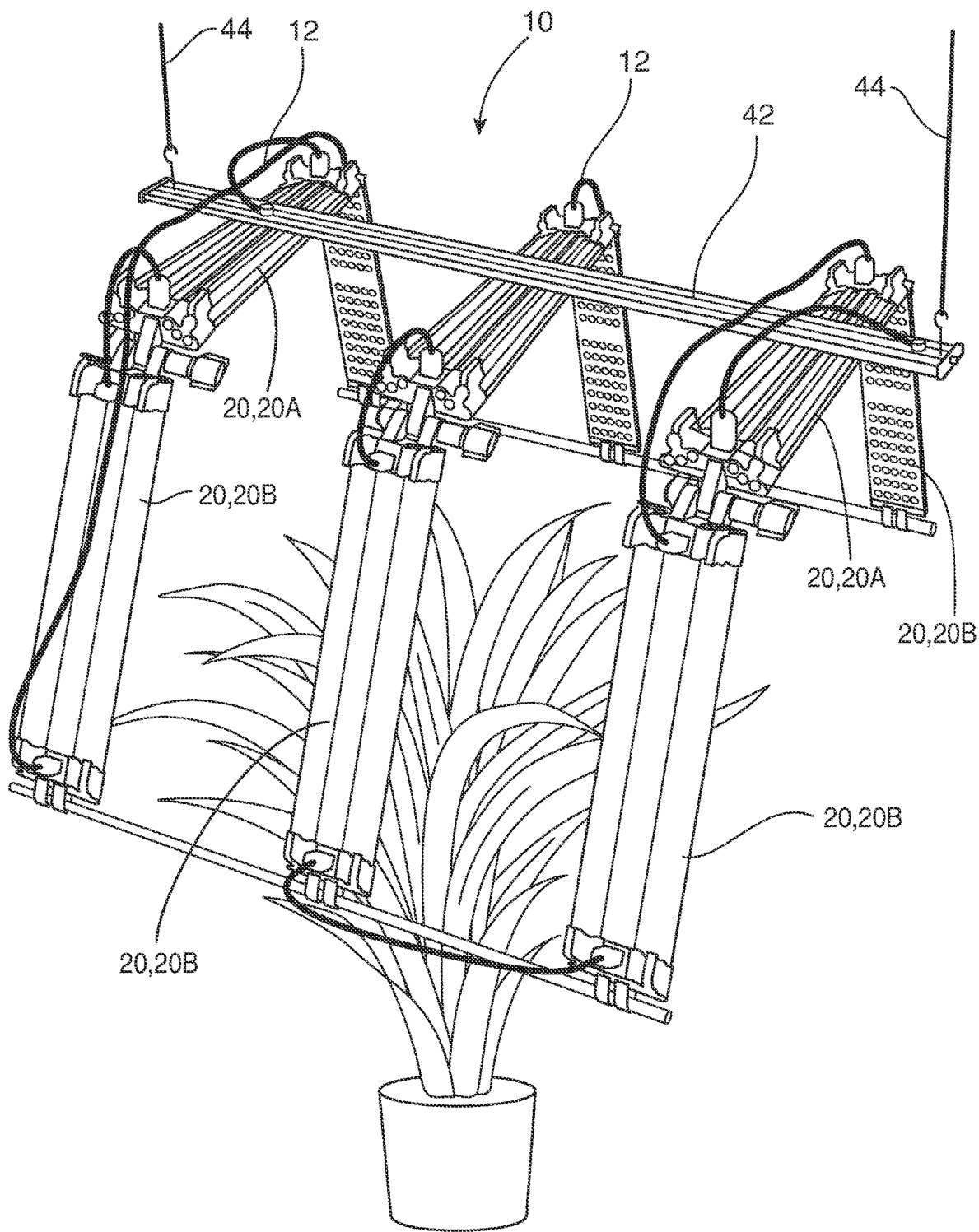
FIG. 2 is a partial top perspective view of the grow light assembly configured in a wrapped or angular form and disposed in a spaced relation with a plant, as disclosed in accordance with at least one embodiment of the present invention.

As shown in the accompanying drawings, and with particular reference to FIGS. 1 and 2, for example, the present invention is directed to a grow light assembly, generally shown as 10. As provided herein, the grow light assembly 10 of the various embodiments is structured and configured to facilitate the growth of one or more plants 1 by emitting light, e.g., by providing photosynthetic active radiation, upon the plant(s) 1 from one or more angles or positions.

For instance, the grow light assembly 10 of at least one embodiment of the present invention comprises one or more light modules 20 that are spaced a distance from the plant(s) 1 or the plant canopy and which are adapted to shine or emit artificial light upon the plant 1 for stimulation of plant growth. In some embodiments, the grow light assembly 10 employs shape lighting technology that allows the one or more light modules 20 to be positioned or adjusted, for example, during the life cycle of the plant(s) 1, in order to at least partially, and in some cases, fully surround the plant(s) 1 with photosynthetic active radiation to stimulate growth. Furthermore, in at least one embodiment, each of the one or more light modules 20 of the present invention may include a plurality of light sources, which in many instances, are low-heat light emitting diodes (LEDs) allowing the light modules to be within three (3) to six (6) inches of the plant, thereby delivering a high amount of photonic grow energy to the plant while utilizing significantly less energy (e.g., 50%) than other light sources.

For instance, still referring to FIGS. 1 and 2, the grow light assembly 10 of at least one embodiment includes a support assembly 40 structured to support, hold or maintain one or more of the light module(s) 20 in a supported or operative orientation. In this regard, the support assembly 40 can include at least one generally rigid or structural base 42 to which one or more of the light modules 20 are mounted, either directly or indirectly. The support assembly 40 of some embodiments can be vertically suspended, for example, from a ceiling or other support structure at least partially above the plant(s) 1. In this manner, one or more support cables 44 or wires can be secured to the structural base 42 for supporting the base 42 in a position at least partially above the plant(s) 1. It should be noted that virtually any support assembly 40 can be used and/or implemented in the various embodiments of the present invention in order to support the one or more light modules 20 in a spaced relation from the plant(s) 1 or plant canopy. As will be described herein, the one or more light modules 20 can be spaced from the plant(s) 1 or plant canopy in a vertical, horizontal or angular orientation in order to maximize the surface area of the plant(s) 1 that receives the artificial light produced by the present invention.

Figure 4:
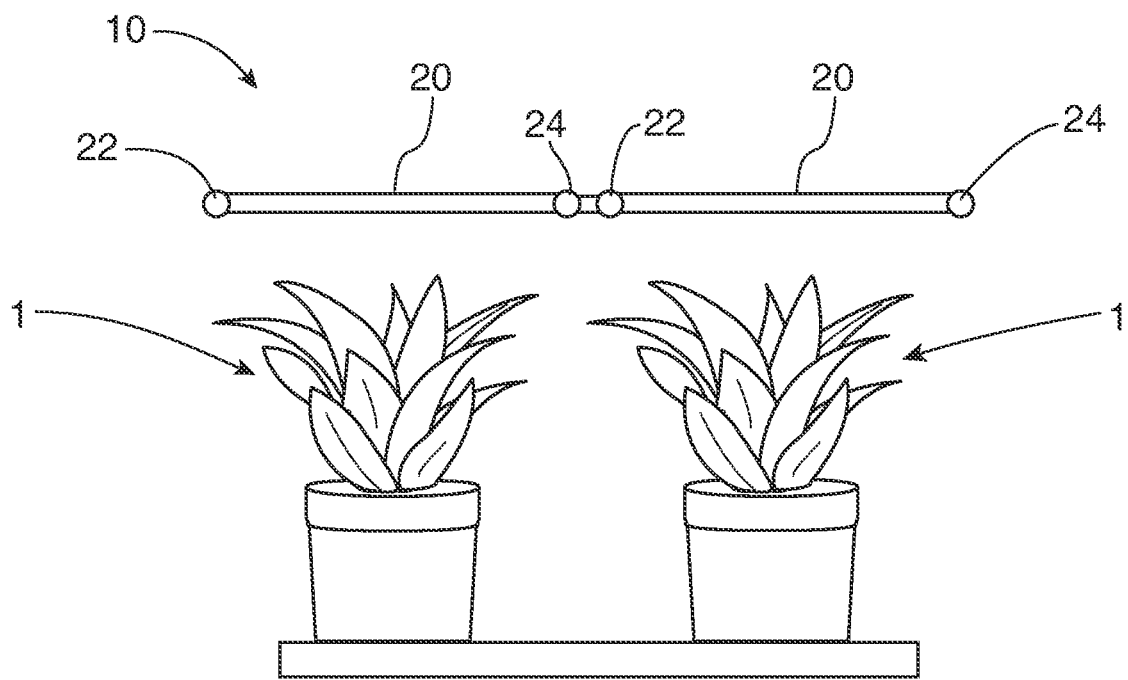
FIG. 4 is an elevation schematic representation of the grow light assembly configured in a linear form and disposed in a spaced relation with a plant, as disclosed in accordance with at least one embodiment of the present invention.

It should also be noted that the grow light 10 of the various embodiments of the present invention can take the form of various shapes, sizes and/or configurations depending on, for example, the particular application, the needs of the plant(s) 1, the spatial or environmental constraints or limitations, etc. For example, with reference to FIGS. 1 and 4, the grow light assembly 10 of at least one embodiment may have a generally "linear" or longitudinal shape or configuration in that the one or more light modules 20 may be disposed in an at least partially vertically spaced relation from the plant(s) 1 or plant canopy and shine or emit light in a general downward direction upon the plant(s) 1 or plant canopy.

Figure 3:
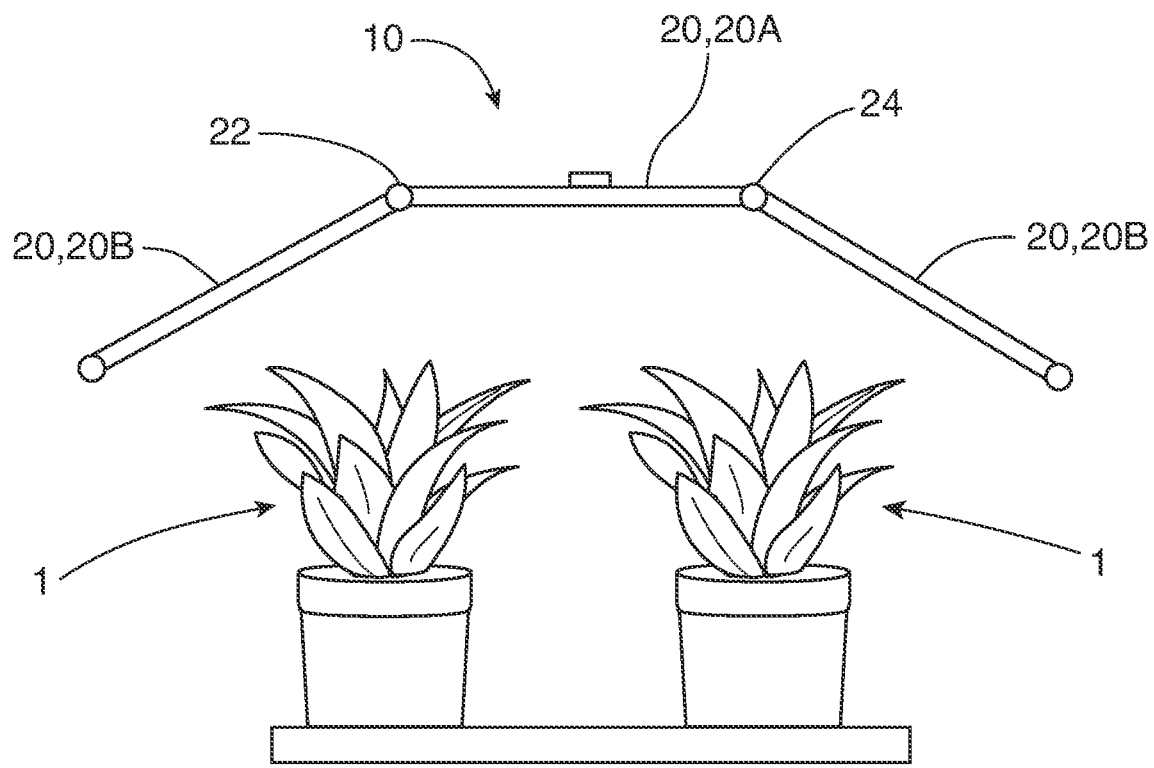
FIG. 3 is an elevation schematic representation of the grow light assembly configured in a wrapped or angular form and disposed in a spaced relation with a plant, as disclosed in accordance with at least one embodiment of the present invention.

FIGS. 2 and 3 illustrate another embodiment wherein the grow light assembly 10 is configured in a generally "wrapped" or angular configuration such that the light module(s) 20 are disposed in different orientations relative to the plant(s) 1. In this embodiment one or more of the light modules 20 (e.g., primary or main light modules 20A) are disposed in a generally horizontal orientation and vertically spaced from the plant(s) 1 or plant canopy, while other light modules 20 (e.g., secondary light modules 20B) are disposed in an angular orientation relative to the plant(s) 1 or relative to the primary or main light modules 20A. In this manner, the primary light modules 20A will emit light from one direction, e.g., down onto the top of the plant(s) 1, while the secondary light modules 20B will emit light from an at least partially side or lateral position, e.g., onto the sides or lower portions of the plant(s) 1.

Figure 5:
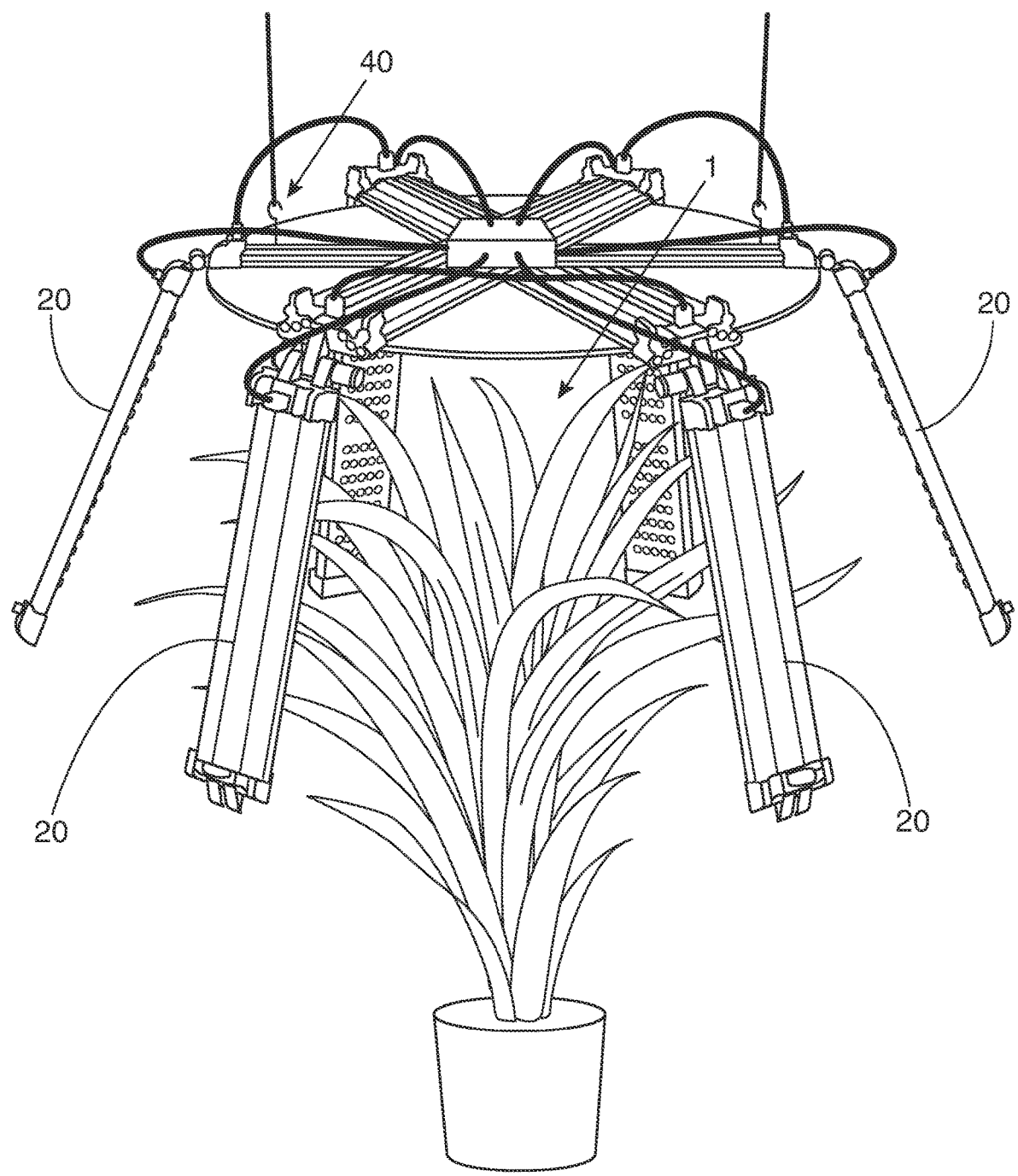
FIG. 5 is an elevation view of another grow light assembly configured in a wrapped or angular form and disposed in a spaced relation with a plant, as disclosed in accordance with at least one embodiment of the present invention.

FIG. 5 illustrates yet another embodiment wherein a plurality of light modules 20 are angularly disposed relative to the support assembly 40 in a manner to at least partially wrap around or encircle the plant(s) 1. Of course, other configurations, shapes and orientations of the grow light 10, including the support assembly 40 and the one or more light modules 20 thereof, are contemplated within the full spirit and scope of the various embodiments of the present invention.

Figure 6:
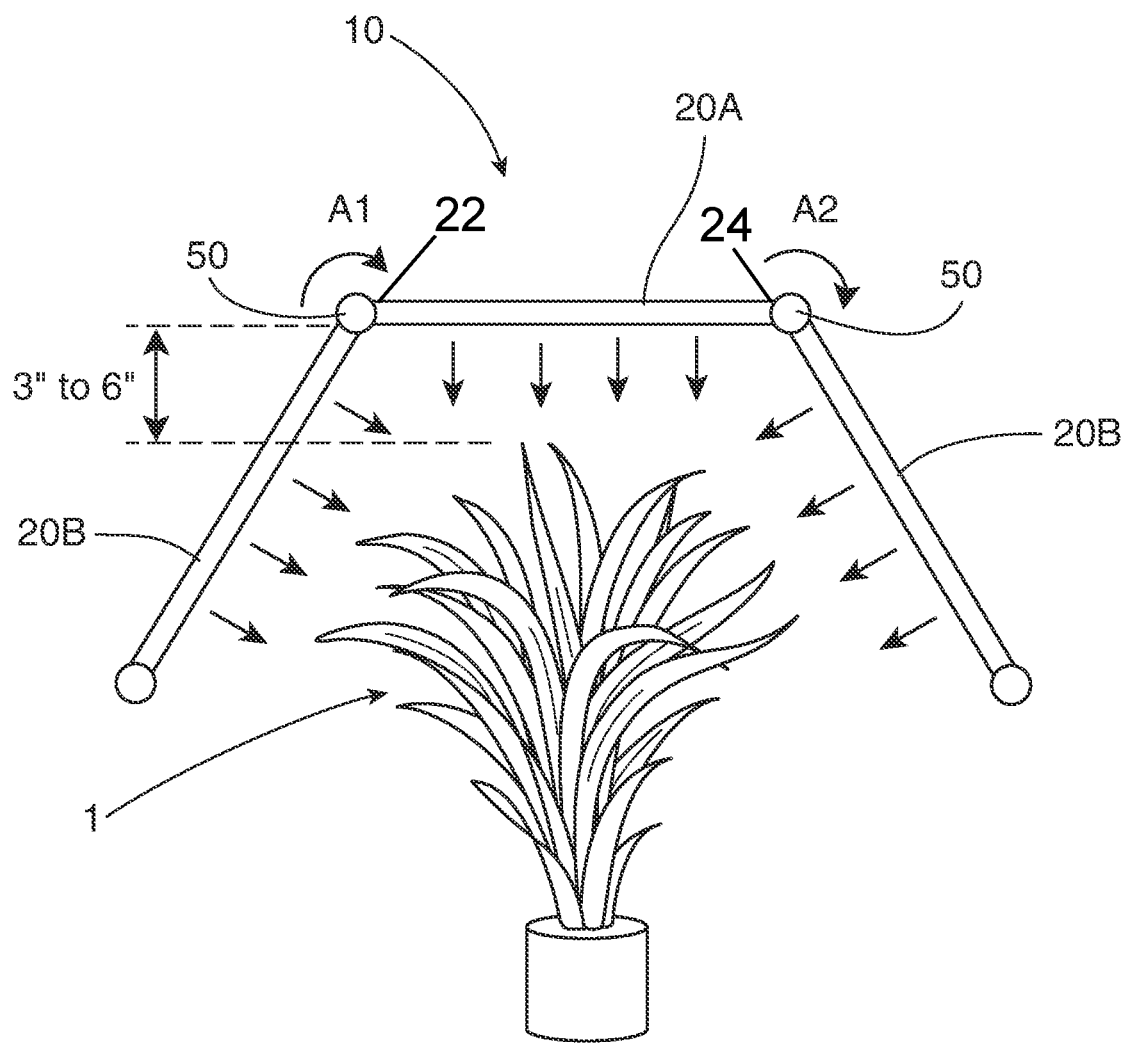
FIG. 6 is an elevation schematic representation of another embodiment of the grow light assembly, as disclosed herein.
Figure 7:
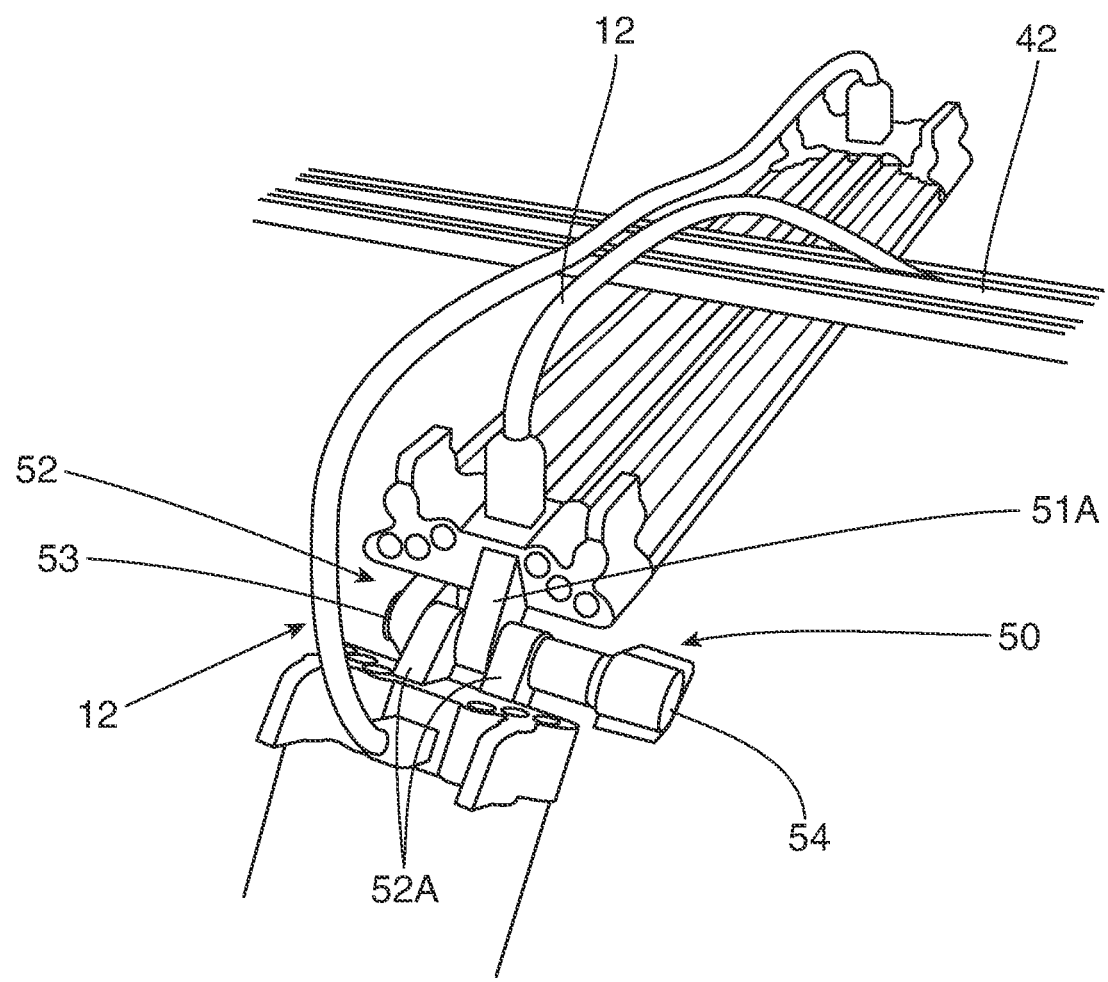
FIG. 7 is a partial cut-away view of the positioning assembly as disclosed in accordance with at least one embodiment of the present invention.

Furthermore, with reference to FIGS. 6 and 7, in at least one embodiment, the present invention includes "shape lighting" in that the orientation and/or position of one or more of the light modules 20 can be adjusted or otherwise moved relative to one another or relative to the plant(s) 1. In this manner, as the plant(s) 1 grows, one or more of the light modules 20 and/or the grow light assembly 10 itself can be moved, adjusted and/or positioned in order to continuously provide the maximum amount of light needed to stimulate the plant growth. For instance, in at least one embodiment, the grow light assembly 10 includes a multi-component modular and positionable system with interconnected LED light modules 20 that provide a multitude of ways in which to fully surround a plant with photosynthetic active radiation (PAR). In particular, the assembly 10 can be used to form a wide variety of multi-directional lighting configurations that project plant specific photosynthetic active radiation energy from a multitude of directions resulting in a more efficient delivery of light and enhanced plant growth.

In this regard, and still referring to FIGS. 6 and 7, at least one embodiment of the present invention includes a positioning assembly, generally referenced as 50, disposed at the joint between interconnected light modules, such as, between a primary light module 20A and an interconnected secondary light module 20B. Particularly, in one exemplary embodiment, at least some of the light modules 20, such as the primary light modules 20A may be fixedly connected to the support assembly 40. The primary light module(s) 20A may also be constructed in a manner to include an elongated configuration with opposite ends, such as a first longitudinal end 22 and a second longitudinal end 24. In some embodiments, a light module 20, such as a secondary light module 20B, may be movably connected to one or more of the ends 22, 24 of a primary light module 20A via a positioning assembly 50. The positioning assembly 50 allows the secondary light module 20B to me movably disposed, either manually, automatically or both, for example, as the plant grows or in order to accommodate spatial or other constraints or limitations.

It should be appreciated that many different configurations can be constructed as desired or depending on the plant, environment, etc. by interconnecting a plurality of the light modules 20 to one another, such as in an end-to-end fashion via positioning assemblies 50, as described herein. In this manner, other configurations can be constructed or built using the light modules 20 of the various embodiments herein, for instance, to interconnect two, three, four or more light modules 20, some or all of which may be selectively movably or positionable relative to one another via one or more positioning assemblies 50.

For instance, with reference to the exemplary embodiment illustrated in FIG. 6, with at least one light module 20, such as a primary light module 20A, disposed in a generally horizontal orientation and spaced a vertical distance from the plant canopy, a plurality of secondary light modules 20B can be movably or angularly mounted to the ends 22, 24 of the primary light module 20A via positioning assemblies 50. As shown by arrows A1 and A2, the secondary light modules 20B can be selectively (e.g., manually, automatically or both) angularly adjusted relative to the plant canopy and/or the primary light module 20A. Doing so can be used to maximize the light emitted onto the surface of the plant 1 by providing light from various angles and directions.

FIG. 7 illustrates an exemplary positioning assembly 50 configured for manually adjustment or selective adjustment of the positioning assembly 50 via manual manipulation. In this embodiment, the positioning assembly 50 includes a hinge, generally referenced as 52. In particular, a pin 53 may be inserted into and/or through corresponding hinge members 51A, 52A interconnected to or part of primary light module 20A and secondary light module 20B, respectively. An adjustment knob 54 or handle, etc. is included to allow for manual tightening or loosening of the hinge 52 in order to accomplish locking and unlocking of the positioning assembly 50. This can be accomplished in such an embodiment by manually twisting or rotating the knob 54 or other handle in a clockwise or counterclockwise orientation, thereby tightening or loosening the hinge 52. Accordingly, in order to adjust, pivot or move the light module 20, such the secondary light module 20B shown in FIG. 7, a user may loosen the hinge 52 or other positioning assembly 50 by manually twisting or rotating the knob 54 in one direction. Once the hinge 52 is loosened, the light module 20, such as the secondary light module 20B, can be pivoted or angularly adjusted relative to the primary light module 20A. When the desired angle is obtained, the user may twist or rotate the knob 54 in the other direction, thereby tightening the hinge 52 and securing the positioning assembly 50, as well as the corresponding light modules 20A, 20B, in place.

Figure 8:
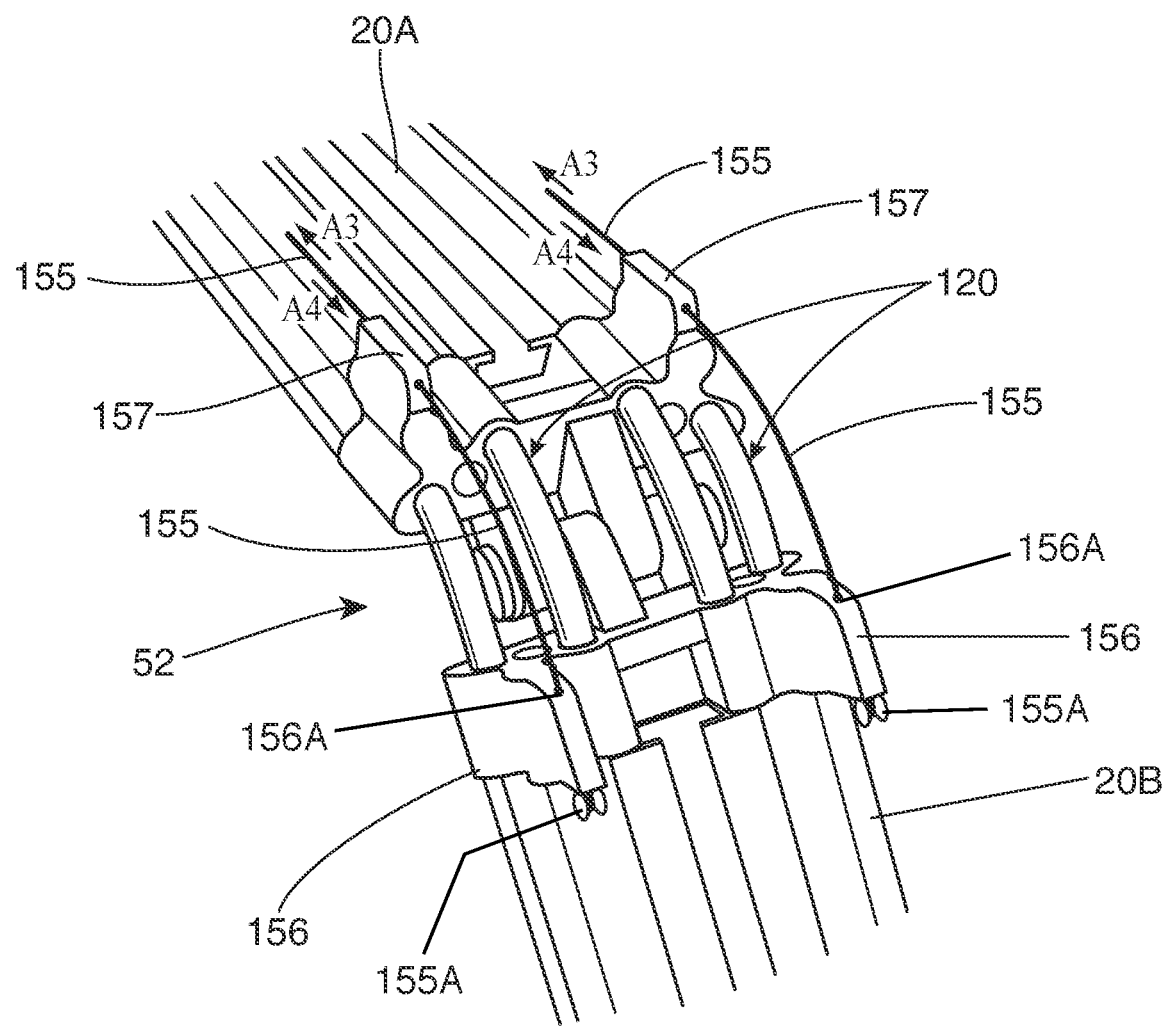
FIG. 8 is a partial cut-away view of the positioning assembly as disclosed in accordance with another embodiment of the present invention.

FIG. 8 illustrates another exemplary positioning assembly 50 which can be implemented via a motor (not shown) to mechanically or electronically maneuver or control the angular position or movement of one or more of the light modules 20A, 20B. For example, light module 20B may be movably interconnected or mounted to the end of another light module 20A via a hinge 52, similar to the hinge 52 illustrated in FIG. 7, although the movement may be controlled via a motor or other like device in addition to or instead of the manual adjustment knob 54. Specifically, in the exemplary embodiment illustrated in FIG. 8, the positioning assembly 50 may include one or more wires or cables 155. In particular, the wire(s) or cable(s) 155 may engage the moving light module, such as secondary light module 20B, while being slidably connected to the primary light module 20A or other portion of the light assembly 10.

For instance, secondary light module 20B may include one or more mounts 156 which the cable(s) or wire(s) 155 can engage. As an example, the mount(s) 156 may include a channel or hole 156A through which the cable(s) or wire(s) 155 are disposed or mounted and which engage or otherwise do not allow the wire(s) or cable(s) 155 to slidably come all the way out. In this manner, the end(s) of the cable(s) or wire(s) 155 may be knotted or otherwise may include an enlarged end, stopper 155A or other like device that will engage the mount(s) 156 and prevent or restrict the cable(s) or wire(s) 155 from completely sliding through the channel or mount(s) 156.

Similarly, the primary light module 20A may include similar mounts 157 through which the same cable(s) or wire(s) 155 are disposed. However, the cable(s) or wire(s) 155 of at least one embodiment can freely slide though the mount(s) 157. The other end of the cable(s) or wire(s) 155 (not shown in FIG. 8) may be connected to or manipulated by a motor or controller, for example, with one or more spools, gears or other like devices capable of pulling or loosening the cable(s) or wire(s) 155.

Accordingly, in the embodiment illustrated in FIG. 8, the positioning assembly 50 may be operated by manipulating the length or positioning of the wire(s) or cable(s) 155, which will, in turn, manipulate the positioning or orientation of hinge 52 and correspondingly, the angular position of light module 20B. For example, pulling the cable(s) or wire(s) 155 in direction A3 will cause the end of the cable(s) or wire(s) 155 to engage mounts 156 and angle the secondary light module 20B in a more upwardly orientation. Also, loosening the cable(s) or wire(s) 155 or otherwise moving the cable(s) or wire(s) 155 in direction A4 will cause the secondary light module 20B to be positioned in a more downwardly orientation.

Other positioning assemblies 50, whether manually operated, mechanical or automatic, can be implemented in accordance with certain embodiments of the present invention in order to allow angular adjustment or movement of one or more light modules 20, as disclosed herein. As such, the positioning assembly 50 shown in FIGS. 7 and 8 should be deemed exemplary in nature and not limiting.

Figure 9:
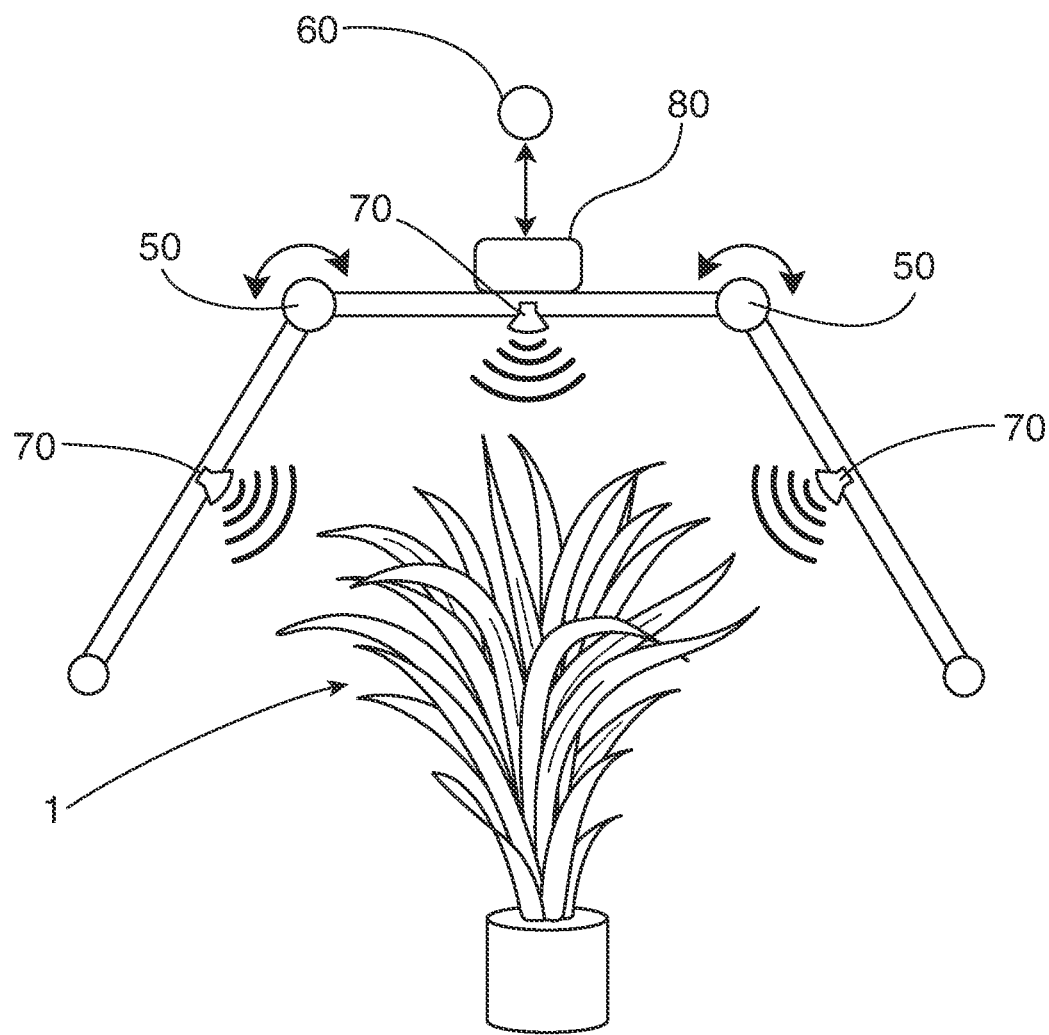
FIG. 9 is an elevation schematic representation of the grow light assembly as disclosed in accordance with yet another embodiment of the present invention.

Some embodiments of the present invention may also include a height adjustment assembly, schematically represented in FIG. 9 as 60. In particular, the height adjustment assembly 60 can be used to adjust the height or vertical positioning of the light assembly 10, for instance, relative to the plant 1 or plant canopy. As with the positioning assembly 50, the height adjustment assembly 60 can be manual and/or automatic. As an example, a manual height adjustment assembly 60 can include one or more cables, pulleys, gears, adjustment knobs, etc. cooperatively configured to allow a user to selectively adjust the height or vertical positioning of the entire light assembly 10.

For example, the height adjustment assembly 60 may be interconnected to the support assembly 40 and/or one or more of the primary light modules 20A. In this manner, vertical movement of the support assembly 40 (or a portion of the support assembly 40, such as base 42) in a vertical direction, will cause the entire light assembly 10, including the primary light module(s) 20A and the secondary light module(s) 20B, to move up and/or down.

It should also be noted that the height adjustment assembly 60 may include one or more motors or electronic components that are used to facilitate the vertical movement or adjustment of the light assembly 10. In this regard, activation of the motor, either manually via a switch or automatic via one or more sensors, will cause the height adjustment assembly 60 to move up and/or down or otherwise in a substantially vertical direction relative to the plant 1. Other height adjustment assemblies, whether manual, automatic, motorized, etc. can be implemented with the full spirit and scope of the present invention.

Still referring to FIG. 9, some embodiments of the present invention may include one or more positioning sensors, generally referenced as 70, disposed in a manner to sense or detect the general location of the plant 1/plant canopy, or otherwise for determining a distance between the one or more light modules 20 and the plant 1 or plant canopy. Specifically, as the plant 1 grows, the distance between the plant 1 and the light assembly 10, or otherwise between the plant 1 and the one or more light modules 20, will decrease. In order to maintain the light modules 20 an optimum or desired distance from the plant 1, the light modules 20 may need to be moved or adjusted throughout the life cycle of the plant 1. In some embodiments, for example, the positioning sensors 70 may be infrared (IR) sensors or IR transmitters/receivers using infrared technology to determine the distance between the plant 1 and the light assembly 10. However, it should be noted and apparent that other sensors using technology other than IR can be used and implemented within certain embodiments of the present invention.

For example, using low heat LED lights, the light modules 20 may be spaced from the plant or plant canopy a distance between three (3) inches and six (6) inches. By being so close, the present invention can deliver higher amounts of photonic grow energy than traditional lights that produce higher levels of heat. In at least one embodiment, the sensors 70 can be used to automatically sense the distance between the light module(s) 20 and the plant during the life cycle of the plant. A controller, generally referenced as 80 in FIG. 9, can be used to receive the data or information obtained by the sensors 70 and control the positioning or location of one or more of the light modules 20. Specifically, using the information from the one or more positioning sensors 70, the controller 80 of at least one embodiment can be used to automatically control the positioning assemblies 50 in order to automatically adjust the positioning or angle of at least some of the light modules 20 relative to the plant 1. As an example, using the embodiment of the positioning assembly illustrated in FIG. 8, the controller 80 may be used to adjust the one or more cable(s) or wire(s) 155, thereby adjusting the angular orientation of the secondary light module(s) 20B.

Similarly, the controller 80 of at least one embodiment, may be used to automatically control the height adjustment assembly 60, for example, based upon the data received or obtain by the one or more positioning sensors 70. In this manner, the controller 80 can automatically adjust the height of one or more of the primary light modules 20A, and/or the support assembly 40 or the light assembly 10 as a whole, based at least in part upon the information or data obtained by the positioning sensors 70.

Accordingly, in at least one embodiment, the positioning sensor(s) 70 can be used to constantly or periodically determine the distance between the plant 1 or plant canopy and the light assembly 10 throughout the life cycle of the plant. Based upon one or more algorithms, rules, etc., the controller 80 can therefore automatically control the distance between the plant 1 and the light assembly 10 by moving or adjusting the light assembly 10 via positioning assemblies 50 (e.g., for angularly adjusting the secondary light modules 20B of some embodiments), and/or by moving or adjusting the light assembly 10 via the height adjustment assembly 60 (e.g., for vertically adjusting the support assembly 40 or primary light module(s) 20A of some embodiments). This can allow the light assembly 10 to be moved and/or adjusted in an automatic manner, without the need for manual adjustment, based at least in part upon the growth or size of the plant(s) 1.

In this regard, the controller 80 may include one or more computer-based modules or components, such as a computer processor, memory, storage device, etc. In some embodiments, the controller 80 may be interconnected to the one or more light modules 20, either directly or indirectly, via one or more data connections. The data connections may be implemented via data cables 12, such as, but certainly not limited to RJ45 cables, that interconnect between the controller 80 and the one or more light modules 20, as shown in FIGS. 1, 2 and 7, for example. For instance, adjacent or different light modules 20 may be interconnected to one another (e.g., via a data cable or other connection), with one of the light modules 20 being directly connected to the controller 80. In such an example, the light modules 20 and the controller 80 may be interconnected in a daisy chain manner, although other combinations and connections are contemplated. For example, USB cables or internal data connections may be implemented. Either way, the data connections can be used to communicate between the various light modules, sensors, and controller, as well as the positioning assembly and height adjustment assembly as described herein.

Furthermore, various motors, pulleys, or other devices can be controlled by the controller 80 in order to implement the features of automatically adjusting or controlling the location or orientation of one or more light modules 20 as provided herein.

In some embodiments, the controller 80 can also be used to control or adjust the light output of the one or more light modules 20 of the various embodiments disclosed herein. For instance, plants use a photosynthetic active radiation (PAR) range of the light spectrum, which in terms of light frequency is in the range of approximately 350 nanometers to approximately 750 nanometers. The controller 80 of at least one embodiment can be used to control or adjust the light output or light frequency of the light modules 20 in order to adjust the color/frequency of the light waves and/or to control when the lights or LED are 'on' or 'off'. In some embodiments, the lights can be selectively or otherwise entered into and/or out of an 'inspection mode' such that the light modules 20 of at least one embodiment can output light in a certain optimum light spectrum allowing for the user to inspect the plants without the need for an additional or separate light. For instance, the lights in many grow rooms are turned 'on' during certain parts of the day and 'off' at other times of the day in order to simulate seasons or otherwise to optimize or control different growth cycles of the life of the plant. With regard to some plants, as an example, such as *cannabis*, there are two key growth stages, a vegetative stage and flowering stage. To maintain the plant in the vegetative cycle, the lights may be kept 'on' eighteen (18) hours a day and turned 'off' six (6) hours a day. When the grower wants to flip the plant into the flowering stage or flower producing stage, light times may be changed to twelve (12) hours 'on' and twelve (12) hours 'off' in a 24-hour period. The change in light times activates the plant into what it perceives as a season change, thereby moving the plant into the flowing stage.

However, if a grower wants to inspect plants during the light 'off' cycle, the grower can enter the room with a green light. The reason for this, is because many plants do not see or react to wavelengths that produce green light (approximately around 550 nanometers), and therefore, exposing the plant to green light will have little to no impact on the plant. This can be important to a grower who wishes to inspect the plant during a light 'off' cycle while, at the same time, making sure not to expose the plant to regular light that may trigger the plant to change stages (e.g., back into a vegetative state). Some plants may have different inspection ranges.

During a light 'on' cycle, LED grow lights can have key red and blue wavelengths of light for growth, which can in some cases, cause the room to appear pinkish in color. This creates a challenge for growers who want to inspect the plant during a light 'on' cycle, in that the pinkish color can inhibit the grower's visual acuity for plant leaf and health inspection.

Accordingly, in at least one embodiment of the present invention, one or more of the light modules 20 can include both green and white LEDs, for inspection purposes. For instance, during a light 'off' cycle, the light module(s) 20 can enter an inspection mode (e.g., via activation by a grower or user), which will cause the light module(s) 20 to illuminate in the green spectrum. This allows night-time plant inspection without the need for a separate green inspection light.

Additionally, during a light 'on' cycle, the light module(s) 20 can enter an inspection mode (e.g., via activation by a grower or user) which will cause one or more of the light modules 20 to switch from a pinkish illumination color or spectrum to a green and/or white illumination spectrum, thereby allowing for better day time plant inspection.

In this manner, the controller 80 of at least one embodiment of the present invention can be configured to control the spectrum or wavelength of light emitted by the one or more light modules 20. This can be done automatically (for example, based upon one or more algorithms, timing schedules, etc.) or manually (for example, based upon a switch, button or value manually controlled). Particularly, in one embodiment, the controller can be used to enter the light module(s) 20 into an 'inspection mode' which will change the spectrum of light emitted based upon the current light cycle (e.g., light 'on' cycle or light 'off' cycle).

Furthermore, the controller 80 of at least one embodiment can be used to control, change of vary the light frequencies and/or wavelengths of the LEDs throughout the life cycle of the plant and/or during certain stages of plant growth. In particular, there are a number of different light frequencies that can be used to drive key aspects of plant growth during the life of the plant. For example, these different frequencies can be in the range of approximately 350 nm (nanometers), 370 nm, 439 nm, 450 nm, 469 nm, 483 nm, 642 nm, 660 nm, 667 nm, and 740 nm. The controller 80 can be used to vary the light power, frequency, wavelength etc. of the LEDs throughout the life cycle of the plant, for example, based on specific algorithms, desired, data obtained, desired outcomes, plant species, etc. As an example, the light power can be varied from a low level at the beginning of a grow cycle to higher increased levels as the plant grows. This can be characterized as a power curve that grows with the plant. This feature results in significant electrical savings when compared to existing lighting technology, such as fluorescent, HPS, and HID lighting.

Figure 10:
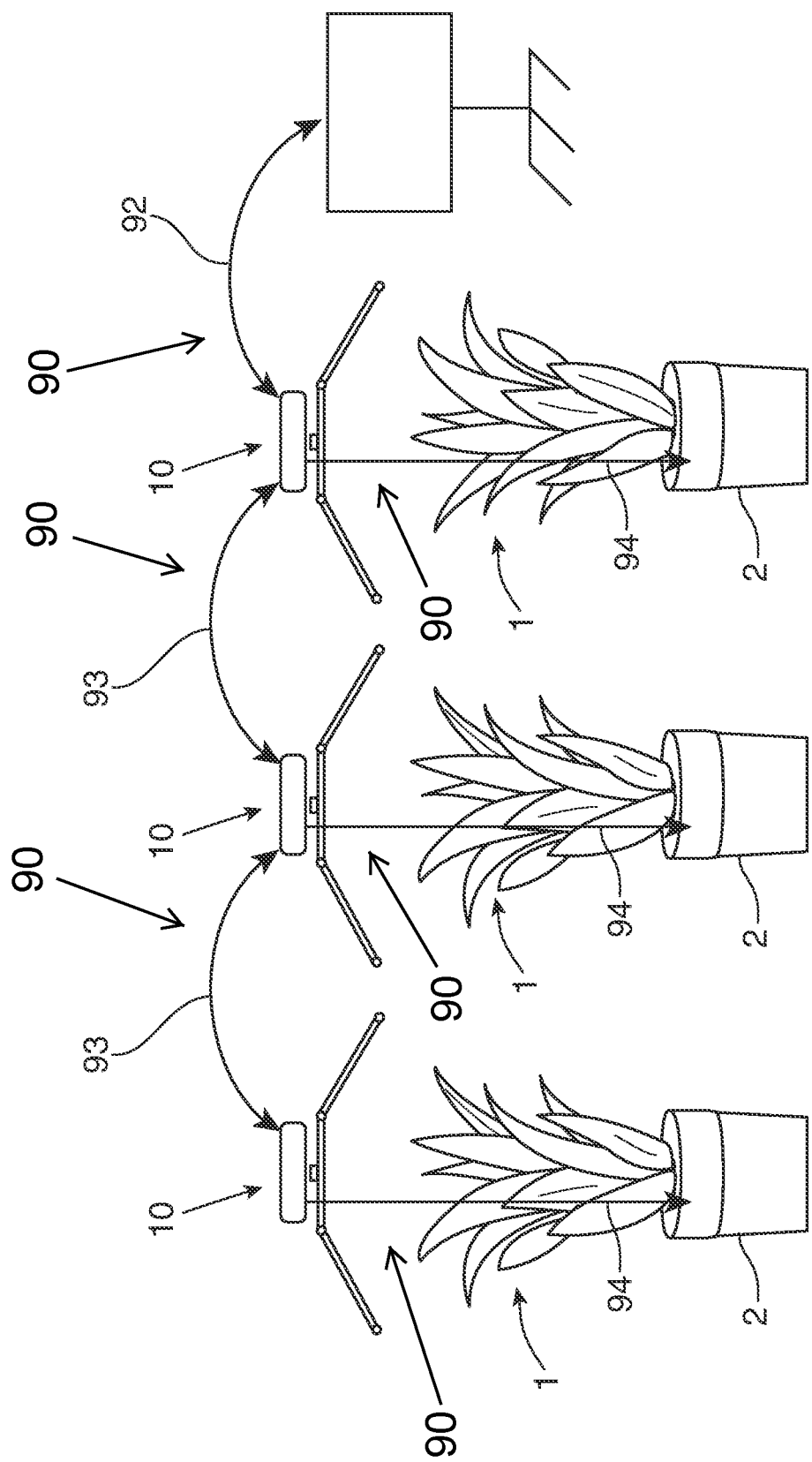
FIG. 10 is a schematic representation illustrating a grounding assembly as disclosed herein.

With reference now to the schematic shown in FIG. 10, yet another embodiment of the present invention includes a grounding assembly 90 comprising a plurality of connections or wires that collectively create a direct or indirect link to the earth. For example, the grounding assembly 90 is configured to connect the indoor plants 1 or plant pots 2 to an outside Earth ground or earthing conductor. Doing so can create an accelerate growth, for example, in the amount of 10% or 20% greater than if the indoor plants 1 or pots 2 are not connected to an outside Earth ground. Accordingly, as shown at 92, at least one wire (an earth-grounded wire) is connected to between at least one light assembly 10 (located indoors) and grounded to the Earth, for example, into dirt or soil located outdoors. A secondary ground wire 94 spans between or is otherwise connected between the light assembly 10 of the present invention and the potted soil within which the plant 1 is disposed.

As shown in FIG. 10, additional light assemblies 10 can be connected to one another via interconnecting wires 93, such that a plurality of light assemblies 10 and plants 1 can be interconnected to the earth-grounded wire 92 either directly or indirectly. Each of the wires 92, 93, 94 can be, but are not necessarily, constructed of or substantially constructed of copper.

Figure 11:
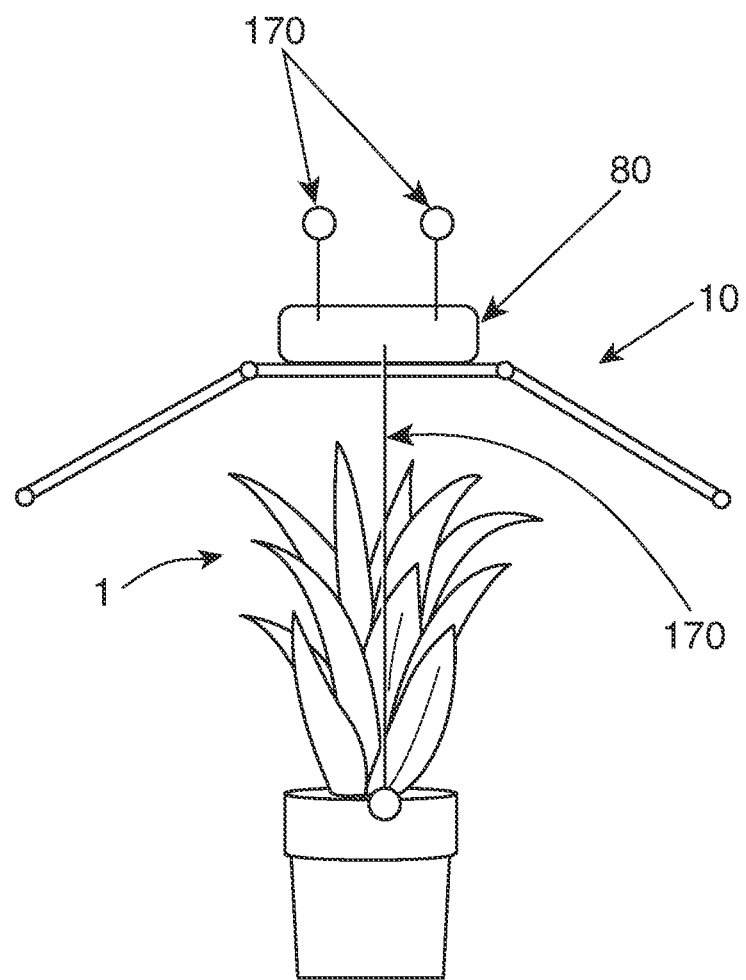
FIG. 11 is a schematic representation illustrating various environmental sensors as disclosed herein.

FIG. 11 schematically represents another embodiment which includes environmental sensors 170. Specifically, controlling and/or monitoring key environmental conditions during indoor growing is often an important aspect in the process for a successful and healthy plant. Accordingly, in some embodiments of the present invention, one or more environmental sensors 170 can be used to monitor and/or control certain environmental conditions. The environmental sensor(s) 170 of some embodiments can include, for example, one or more temperature sensors, humidity sensors, $CO_2$ sensors, soil water or moisture sensors, etc. Accordingly, these environmental sensors, depending on the type of sensor used, can be connected to the light assembly 10 and exposed to the ambient air (e.g., to determine or measure temperature, humidity, $CO_2$, etc.) or connected to the light assembly 10 and exposed to the plant or plant soil (e.g., to determine moisture, etc.) The one or more environmental sensors 170 can be connected in a plug-and-play manner to the light assembly 10, for example, via a data cable or data connection (e.g., USB, RJ45, etc.

In some embodiments, the controller 80 may be used to receive and/or store the data obtained by the one or more environmental sensors 170. This information can be interpreted by the controller 80 and/or obtain by a grower or other use via aired or wireless connection to the controller 80 or light assembly 10. Using the data or information obtained by the environmental sensor(s) 170, the controller or grower can then adjust environmental conditions in an effort to create an optimum growing environment for the particular plant(s) involved.

Figure 12:
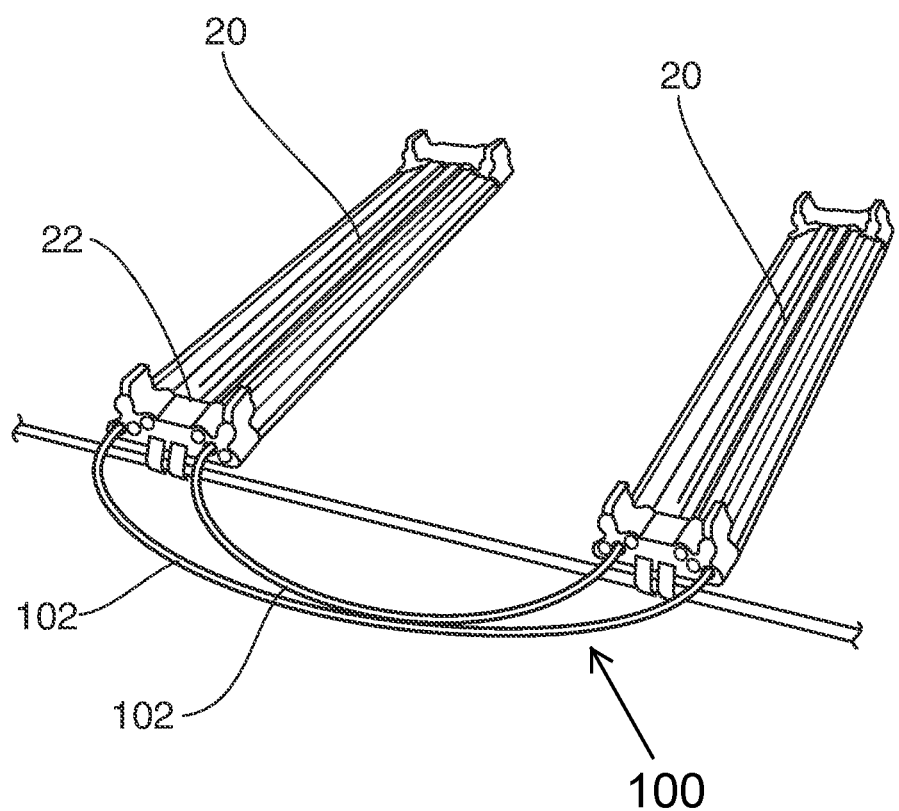
FIG. 12 is a partial cut away view illustrating a cooling assembly as disclosed herein.
Figure 13:
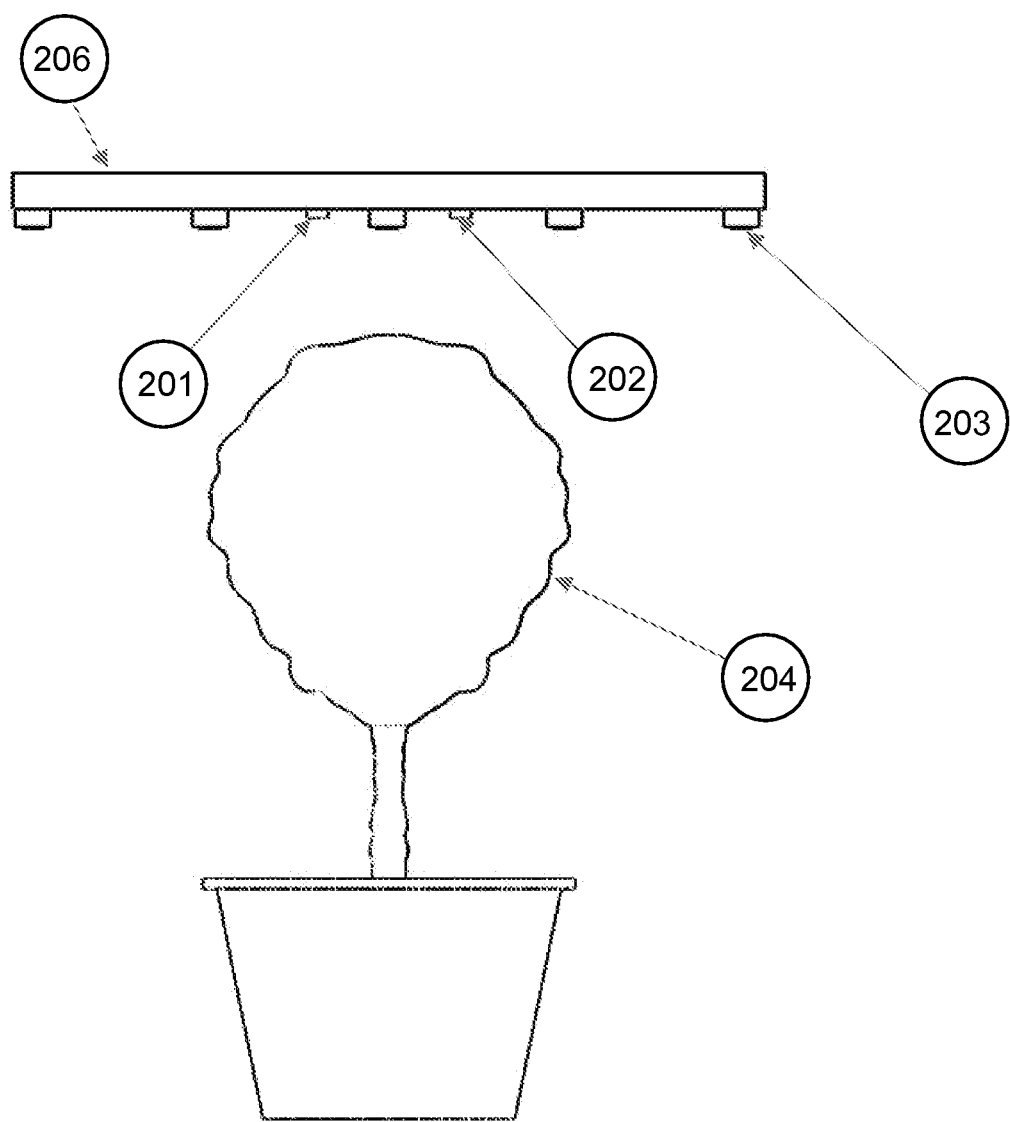
FIG. 13 is a plan view of the system and method of at least one embodiment of the present invention suspended over the canopy of a plant.
Figure 14:
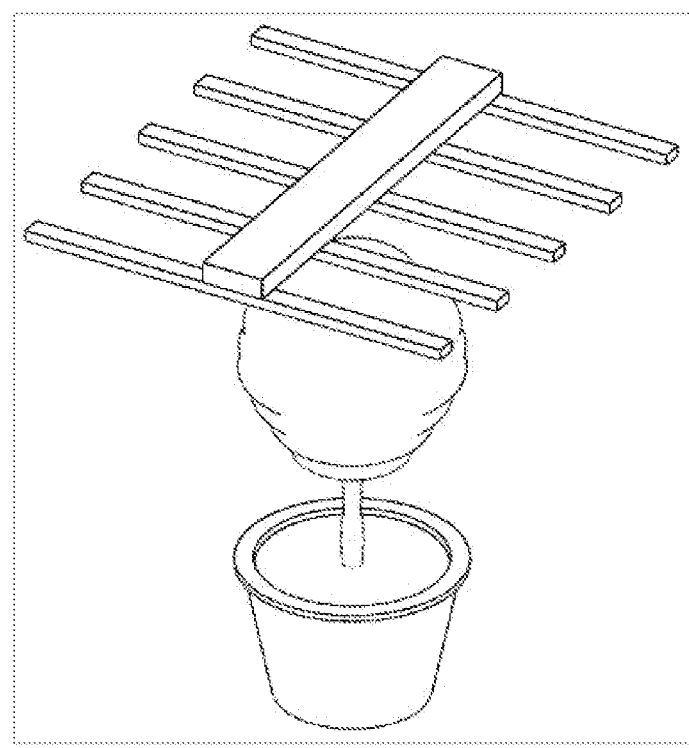
FIG. 14 is a top perspective view of the illustration of FIG. 13.
Figure 15:
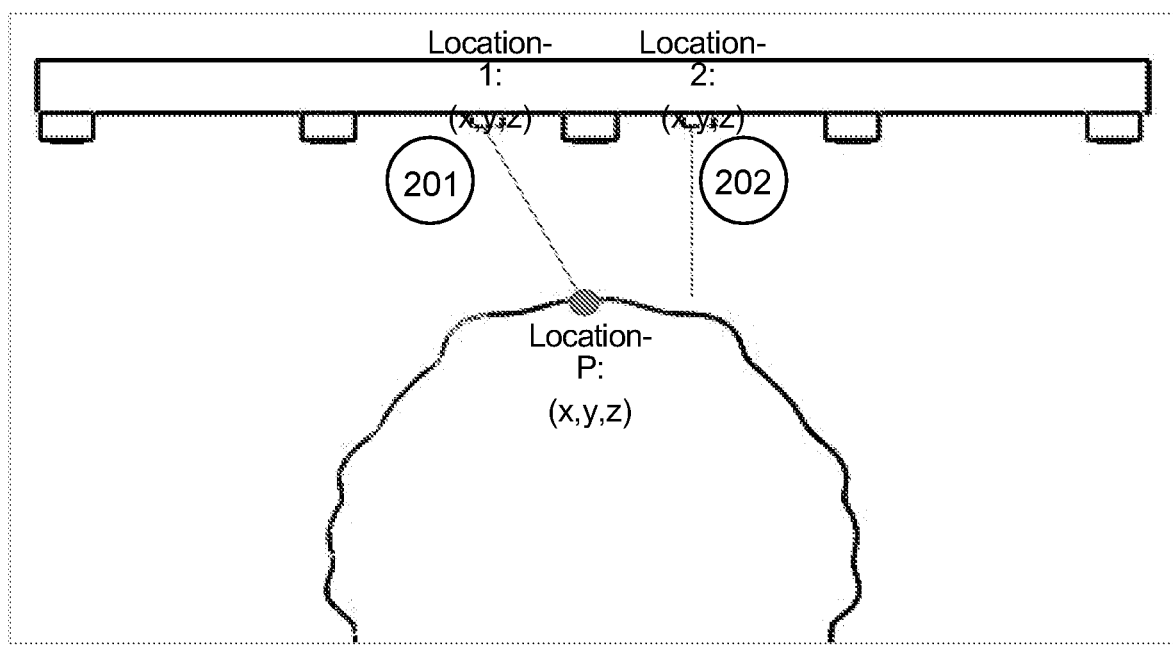
FIG. 15 is a close-up view of at least one embodiment of the present invention.

With reference now to FIG. 12, at least one embodiment further includes a cooling assembly, generally shown as 100. The cooling assembly 100 includes at least one tube 102 disposed at least partially through at least one of the light modules 20, such as, the primate light modules 20A or secondary light modules 20B, and which are adapted to carry a cooling liquid or fluid (e.g., water) there through. As an example, and as shown in FIG. 12, the tube(s) 102 may enter through one or more of the longitudinal ends 22, 24 of the light modules 20 though a corresponding channel positioned longitudinally through the light module 20. The flow of water or other liquid through the tubes 102 will serve to assist in liquid cooling of the light assembly 10.

Additional embodiments of the present invention may include a $CO_2$ or other gas distribution assembly. Specifically, typical $CO_2$ levels in a normal or unregulated room may be between about 300 to 400 ppm. Plants with increased $CO_2$ levels (e.g., in the range of approximately 1500 ppm) can grow at an accelerated rate. $CO_2$ is heavier than air, and thus, it tends to fall to the floor. Because of this, many growers will attempt to circulate the air and CO2 in a grow room via large fans. This can increase electrical consumption and in some cases, the unnatural flow of air can disrupt the plant grow cycle.

Accordingly, some embodiments of the present invention include a CO2 deliver system integrated within one or more of the light modules 20 such that the CO2 is provided at the plant canopy level allowing the CO2 to fall over the plant, where it is needed most. With reference to FIG. 8, in some embodiments, the joints between adjacent or interconnect light modules 20 may include integrated CO2 delivery passages or tubes generally referenced as 120. The tubes 120 pass longitudinally through the light modules 20 (e.g., through longitudinal channels) and are exposed at the joints. CO2 can be pumped through these tubes 120 (via a tank or other CO2 source, not shown). Holes in the tubes 120, for example, at or near the joints will allow the CO2 to escape the tubes 120 and fall over the plant canopy.

Other CO2 delivery systems and/or assemblies may be contemplated and integrated within the one or more light modules 20 of the present invention. For example, the CO2 delivery tube(s) 120 may be located along the outside of the light assembly 20, for example, longitudinally along the edge (rather than substantially within a longitudinal channel).

Furthermore, some embodiments of the present invention may include a web or application based control center such that a grower or user can control the light assembly 10 and/or access data or information obtained by the light assembly 10. For instance, a user may access a web page, desktop application or mobile application to view data or information obtained by one or more of the sensors, to control or program the light output of the LEDs, to turn the light assembly and/or portions of the light assembly on or off, etc. In this manner, the light assembly 10 may be connected to a network, such as the Internet, World Wide Web, Wide Area Network, Local Area Network, private network, etc. in order to communicate with a control center application or user application, for example. Accordingly, the assembly may include a web server or local server to store certain data and/or facilitate communications between the controller 80 and the user or user application. In other embodiments, however, the controller 80 may communicate directly with the user application.

In particular, via the user application or control center application, the user can control and monitor the growing process, including scheduling events, such as controlling the light output or the positioning of the light modules. A simulation system or assembly may also be included that has the ability to simulate a grow process, based on selected or installed equipment, providing calculated electrical costs for the entire grow cycle or a portion thereof. This provides the user with the ability to make simulated tweaks or changes to minimize electrical or other costs. Once satisfied, the user can activate the system, which will then begin executing the commands automating the entire grow process. Once the user has optimized the controls, schedules, positions, etc. of the system, it can be repeated again and again ensuring consistency and repeatability.

With reference now to the embodiment illustrated in FIGS. 13 through 16B, the intended operation of the system or method would involve placing the integrated lighting system over the top of any plant regardless of species. The system or method would then apply initial preset color light ratios and begin monitoring plant canopy growth. The system or method will then monitor the canopy growth, utilizing advanced machine learning algorithms, and then begin adjusting light ratios while also monitoring canopy growth rate.

The system or method of at least one embodiment would continually adjust light ratios with the sole intent of converging on an optimized 'light recipe' that would maximize the growth rate of the plant in the shortest period of time. This system or method would allow cultivators to place the grow light machine learning system over any plant, and then have the system automatically converge and find an optimized lighting recipe solution for that particular species of plant.

More in particular, FIG. 12 illustrates an exemplary plan view of the system and method of at least one embodiment of the present invention. The references shown therein are as follows:

201: Camera-1
   202: Camera-2
   203: Multi-LED Color LED Luminaire
   204: Plant Canopy
   205: Grow Light Machine Learning Assembly
   206: Power Supply and System Brain Enclosure Knowing the position in 3D space of Camera-1 and Camera-2 and taking images from both cameras at the same time allows one to measure the canopy height as follows: Utilizing edge detection software methodologies to identify the same pixel of a leaf edge in each of the two camera images, combined with knowing the 3D spatial position of each camera, allows calculation via geometry of the 3D special location of that particular pixel, i.e. leaf edge, i.e. canopy height. Gathering multiple pixels locations form the images in 3D space and applying an averaging algorithm creates the abilities to define canopy height at that given time when the images where taken.

Additional Considerations and/or advantages of at least one embodiment of the present invention:

Camera images can be utilized to analyze plant/leaf color and thus determine the health of the plant. This color data may also be integrated into the machine learning algorithms as an additional component to the color ratios for optimizing plant growth.

Digital images can be taken when specific colors of LEDs are illuminated such as UV, Blue, Red, Far Red, White, or Green. Taking digital images with certain monochromatic LEDs illuminated or a particular combination of LED colors illuminated may allow the identification of plant pests or disease via software imaging analysis at early stages before the human eye can detect such potential problems.

Integrating environmental sensors data (temp, humidity, CO2, pressure, etc.) as input to the machine learning algorithms may also provide additional data in combination with light ratio data for plant growth speed optimization.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A grow light assembly with selectable inspection mode, comprising:
   at least one light module, and
   a controller,
   said at least one light module being disposed a distance away from a plant canopy, wherein said at least one light module comprises a plurality of light emitting diodes structured to emit light upon the plant canopy,
   said controller being communicative with said at least one light module and adapted to control a light output of said a least one light module,
   wherein said at least one light module is configured to operate in at least two different cycles, said at least two different cycles comprising an on cycle and an off cycle, wherein said on cycle is configured to simulate daytime and wherein said off cycle is configured to simulate nighttime,
   wherein, in response to a manual input, said controller is configured to enter said at least one light module into an inspection mode,
   wherein, if, at the time of said manual input, said at least one light module is operating in said on cycle, then said controller is configured to change said light output of said at least one light module to a white light, and
   wherein, if, at the time of said manual input, said at least one light module is operating in said off cycle, then said controller is configured to change said light output of said at least one light module to a green light.

2. The grow light assembly as recited in claim 1 wherein said inspection mode entered during said off cycle is further defined as said at least one light module being configured to emit a light output with a wavelength that is approximately 550 nanometers.

3. The grow light assembly as recited in claim 1 wherein during said on cycle, and when said at least one light module is not in said inspection mode, said at least one light module is configured to emit a light output comprising at least red and blue lights.

4. A method of operating a grow light assembly with an inspection mode, the method comprising:
   defining the grow light assembly as comprising at least one light module and a controller, the at least one light module being spaced a distance away from a plant, and wherein said at least one light module comprises a plurality of light emitting diodes that emit light upon the plant, the controller being communicative with the at least one light module and adapted to control a light output of the at least one light module,
   operating the at least one light module in a day cycle, wherein the day cycle is defined as the at least one light module being configured to emit a light output comprising at least red light,
   operating the at least one light module in a night cycle, wherein the night cycle is defined as the at least one light module being configured to simulate nighttime,
   receiving a manual activation of an inspection mode,
   wherein, if, upon receiving the manual activation of the inspection mode, the at least one light module is operating in the day cycle, then changing, via the controller, the light output of the at least one light module to a white light, and
   wherein, if, upon receiving the manual activation of the inspection mode, the at least one light module is operating in the night cycle, then changing, via the controller, the light output of the at least one light module to a green light.

5. The method as recited in claim 4 wherein, during the night cycle, the at least one light module is turned off.

6. The method as recited in claim 4 further comprising during the inspection mode entered during the night cycle, the light output of the at least one light module comprise a wavelength of approximately 550 nanometers.

* * * * *